(12) United States Patent
Naphade et al.

(10) Patent No.: US 8,972,484 B2
(45) Date of Patent: Mar. 3, 2015

(54) METHOD AND APPARATUS FOR EFFICIENT AND ACCURATE ANALYTICS WITH CROSS-DOMAIN CORRELATION

(75) Inventors: Milind Naphade, Fishkill, NY (US); Sambit Sahu, Hopewell Junction, NY (US); Jing Dai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 13/029,699

(22) Filed: Feb. 17, 2011

(65) Prior Publication Data

US 2012/0215829 A1   Aug. 23, 2012

(51) Int. Cl.
*G06F 15/16* (2006.01)
*G06F 15/18* (2006.01)
*G06N 99/00* (2010.01)

(52) U.S. Cl.
CPC .............. *G06F 15/18* (2013.01); *G06N 99/005* (2013.01)
USPC ........... 709/203; 709/204; 709/219; 709/223; 709/224

(58) Field of Classification Search
CPC ........................................................ H04B 1/66
USPC .......... 709/203, 204, 205; 340/13.3, 440, 443
See application file for complete search history.

(56) References Cited

U.S. PATENT DOCUMENTS

| | | | |
|---|---|---|---|
| 7,920,983 B1 * | 4/2011 | Peleg et al. .................... 702/100 |
| 7,949,123 B1 * | 5/2011 | Flockhart et al. ......... 379/266.03 |
| 8,176,095 B2 * | 5/2012 | Murray et al. ................. 707/805 |
| 8,306,848 B1 | 11/2012 | Naphade et al. |
| 8,316,237 B1 * | 11/2012 | Felsher et al. ................. 713/171 |
| 2002/0050932 A1 * | 5/2002 | Rhoades et al. .......... 340/870.16 |
| 2003/0058095 A1 * | 3/2003 | Satoh ............................ 340/509 |
| 2003/0229572 A1 * | 12/2003 | Raines et al. .................... 705/37 |
| 2004/0190627 A1 * | 9/2004 | Minton et al. ............ 375/240.19 |
| 2005/0066050 A1 * | 3/2005 | Dharamshi .................... 709/232 |
| 2008/0027772 A1 | 1/2008 | Gernega et al. |
| 2008/0211660 A1 * | 9/2008 | Takeuchi ....................... 340/514 |
| 2009/0125367 A1 * | 5/2009 | Brink et al. ....................... 705/9 |
| 2010/0042453 A1 | 2/2010 | Scaramellino et al. |
| 2010/0185486 A1 | 7/2010 | Barker et al. |

(Continued)

OTHER PUBLICATIONS

"Microcontroller Based Automated Water Level Sensing and Controlling: Design and Implementation Issue"—Reza et al, Oct. 2010 http://www.iaeng.org/publication/WCECS2010/WCECS2010_pp220-224.pdf.*

(Continued)

*Primary Examiner* — Randy Scott
(74) *Attorney, Agent, or Firm* — F. Chau & Associates, LLC; Louis J. Percello

(57) ABSTRACT

A method of generating analytics to provide an analysis of data from distinct data domains includes collecting sensor data from at least two distinct data domains, deriving parameters from the collected data, wherein at least one of the parameters is a first domain parameter derived from one of the data domains and at least another one of the parameters is a second domain parameter derived from the other data domain, providing a data model that enables a user to specify at least one of the first parameters and at least one of the second domain parameters and generate at least one rule based on the selected parameters, and generating analytics that analyze the collected data against the rules to determinate whether the rules have been satisfied and provide results of the analysis to a user of the analytics.

18 Claims, 7 Drawing Sheets

(56) References Cited

U.S. PATENT DOCUMENTS

| | | |
|---|---|---|
| 2010/0197325 A1 | 8/2010 | Dredge |
| 2011/0022812 A1* | 1/2011 | van der Linden et al. .... 711/163 |
| 2011/0100005 A1* | 5/2011 | Sampson et al. ............. 60/641.8 |
| 2011/0166936 A1 | 7/2011 | Dixon et al. |

OTHER PUBLICATIONS

Litman, et al., "Transit Price Elasticities and Cross-Elasticities", Journal of Public Transportation, vol. 7, No. 2, 2004.

Alvinsyah, et al., "Impact of the Existing Corridor Due to Implementation of New Public Transport Corridor (Case Study: Jakarta BRT Systems." Journal of the Eastern Asia Society for Transportation Studies, vol. 6, pp. 467-479, 2005.

Baxter, et al., "Sugar House Transit Corridor Alternatives Analysis." Jul. 2008.

Memorandum to the Honorable Mayor and City Council Members of the City of Dubuque regarding "City in Motion—An IBM First of a Kind Proposal", dated Oct. 1, 2010.

Leduc, Guillaume, "Road Traffic Data: Collection Methods and Applications." JRC Technical Notes, Working Papers on Energy Transport and Climate Change N.1, 2008.

Shaheen et al. "Public Transit Training: A Mechanism to Increase Ridership Among Older Adults." Retrieved from [URL:http://tsrc/berkeley.edu/node/313], dated Wed., Sep. 1, 2010.

Chapleau et al. "Visualization of the Urban Transportation Reality: Some Key Views." Moving through nets: The physical and social dimensions of travel, 10th International Conference on Travel Behaviour Research, Lucerne, Aug. 10-15, 2003.

Thiagarajan et al., "Cooperative Transit Tracking Using Smartphones." SenSys'10, Nov. 3-5, 2010, Zurich, Switzerland.

Trepanier et al., "Calculation of Transit Performance Measures Using Smartcard Data." Journal of Public Transportation, vol. 12, No. 1, 2009.

Notis, Ken, "Federal Subsidies to Passenger Transportation." U.S. Department of Transportation: Bureau of Transportation Statistics, Dec. 2004.

Derrible et al., "Network Analysis of World Subway Systems Using Upgraded Graph Theory," Transportation Research Record: Journal of the Transportation Research Board, No. 2112, Transportation Research Board of the National Academies, Washington, D.C. 2009, pp. 17-25.

Nham et al., "Predicting Mode of Transport from iPhone Accelerometer Data." Retrieved from [URL: http://cs229.standford.edu/proj2008/NhamSiangliulueYeung-PredictingModeOfTransportFromIphoneAcceerometerData.pdf], published 2008.

Babka et al., "Removing Barriers for Seniors at Transit Shops and Stations and the Potential for Transit Ridership Growth," TRB 2008 Annual Meeting, submitted on Aug. 1, 2007.

Zheng et al., "Understanding Transportation Modes Based on GPS Data for Web Applications." ACM Transactions on the Web, vol. 4, No. 1, Article 1, Publication date: Jan. 2010.

US Office Action dated Dec. 12, 2012 corresponding to U.S. Appl. No. 13/549,777.

US Office Action dated Dec. 7, 2012 corresponding to U.S. Appl. No. 12/880,915.

US Office Action dated Apr. 9, 2013 corresponding to U.S. Appl. No. 12/880,915.

* cited by examiner

METHOD AND APPARATUS FOR EFFICIENT AND ACCURATE ANALYTICS WITH CROSS-DOMAIN CORRELATION

BACKGROUND

1. Technical Field

The present disclosure relates to facilitating the generation of cross-domain analytics.

2. Discussion of Related Art

Analytics is the application of computer technology, operations research, and statistics to solve problems in business and industry. The science of analytics is concerned with extracting useful properties of data using computable functions and may involve extracting (e.g., mining) properties from large data bases. Analytics may be used to obtain an optimal or realistic decision based on existing data.

Some Analytics use instrumented data (e.g., data measured by instruments) collected from a single domain to provide guidance to provide insights about that domain. As an example, water consumption data from the water consumption domain could be used to derive insights about the water usage of one or more consumers. However, Analytics derived from such single domain data may have ambiguities due to incomplete information.

BRIEF SUMMARY

According to an exemplary embodiment of the present invention, a method of generating analytics to provide an analysis of data from distinct data domains includes collecting data from at least two distinct data domains, providing a data model that enables a user to specify parameters derived from the at least two data domains, respectively, and generate at least one rule based on the specified parameters, and generating analytics that analyze whether the rules have been satisfied based on the collected data and provide results of the analysis. The method is performed by a data processing machine.

According to an exemplary embodiment of the present invention, a method of generating analytics to provide an analysis of data from distinct data domains includes collecting data from at least two distinct data domains, deriving parameters from the collected data, wherein at least one of the parameters is a first domain parameter derived from one of the data domains and at least another one of the parameters is a second domain parameter derived from the other data domain, providing a data model that enables a user to specify at least one of the first parameters and at least one of the second domain parameters and generate at least one rule based on the specified parameters, and generating analytics that analyze the collected data against the rules to determinate whether the rules have been satisfied and provide results of the analysis to a user of the analytics. The method is performed by a data processing machine.

A system according to an exemplary embodiment of the present invention provides an analysis of sensor data from distinct data domains to clients. The system includes a computer network, first sensors, second sensors, a plurality of client workstations, and a server workstation. The first sensors are configured to measure data from a first data domain and transmit the measured data across the network. The second sensors are configured to measure data from a second data domain and transmit the measured data across the network. The data domains are different from one another. The client workstations are configured to communicate across the network. The server workstation is remote from client workstations and configured to communicate with the client workstations and receive the measured data from the sensors across the network. The server workstation includes a user interface server, a database server, and analytics. The user interface enables a user to select parameters derived from the data domains, respectively, and generate correlation rules based on the selected parameters. The database server stores the sensor data, the parameters, and the correlation rules. The analytics analyze the stored sensor data against the rules to determine whether they have been satisfied.

A system according to an exemplary embodiment of the present invention provides an analysis of sensor data from distinct data domains to clients. The system includes a server workstation that communicates with client workstations remotely across a network and receives measured sensor data from at least two information silos across the network. The server workstation includes a security server, a database server, a source data staging area, a data integration server, analytics, and a user interface server. The security server authenticates clients of the client workstations that desire to connect to the cloud computing infrastructure. The database server stores correlation rules based the sensor data from both the information silos. The source data staging area temporarily buffers the measured sensor data. The data integration server integrates the buffered sensor data into tables in the database server. The analytics analyze the stored sensor data against to rules to determine whether they have been satisfied. The user interface server provides the clients with access to results of the analysis.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Figure 1:
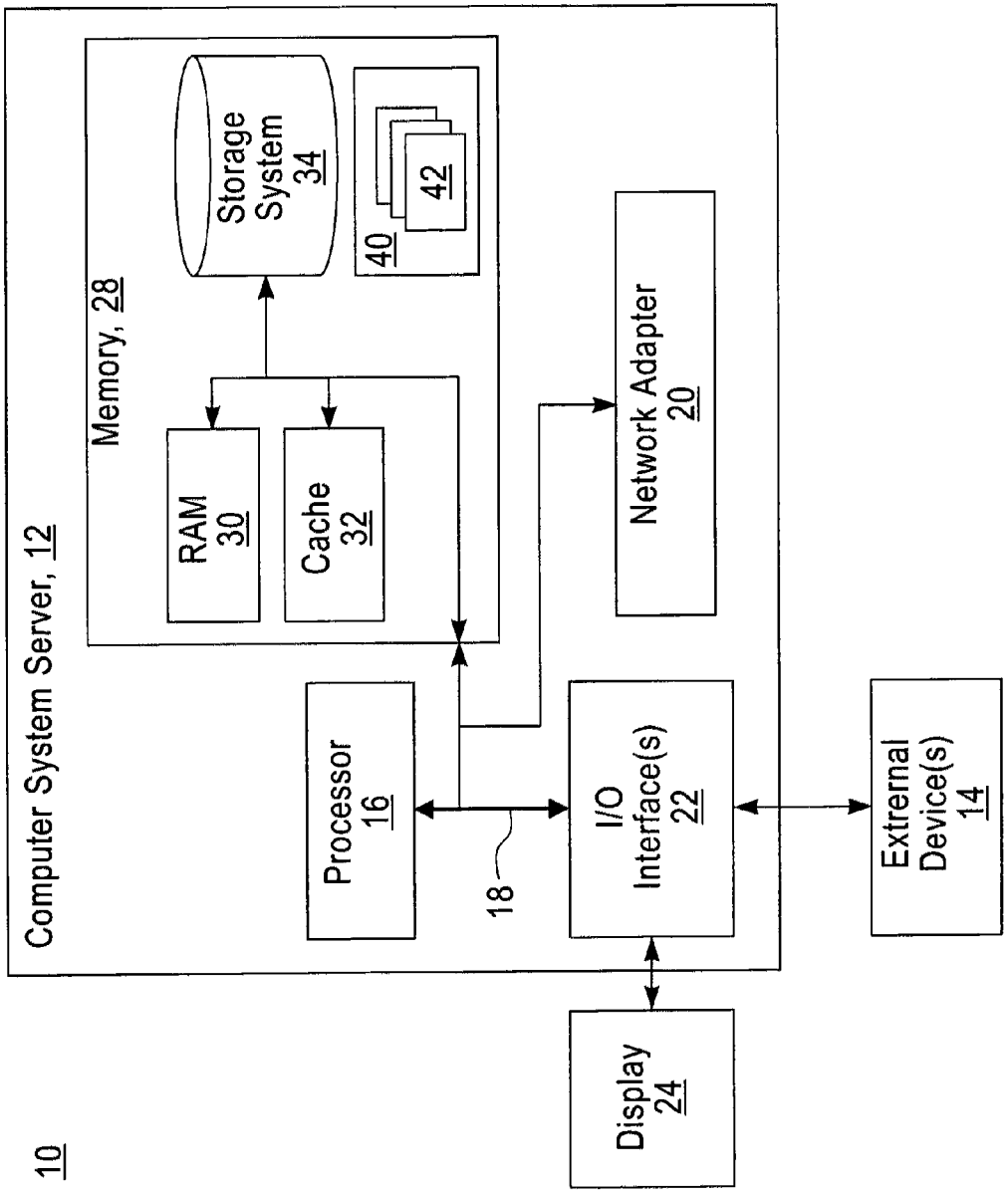
FIG. 1 depicts a cloud computing node according to an embodiment of the present invention.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
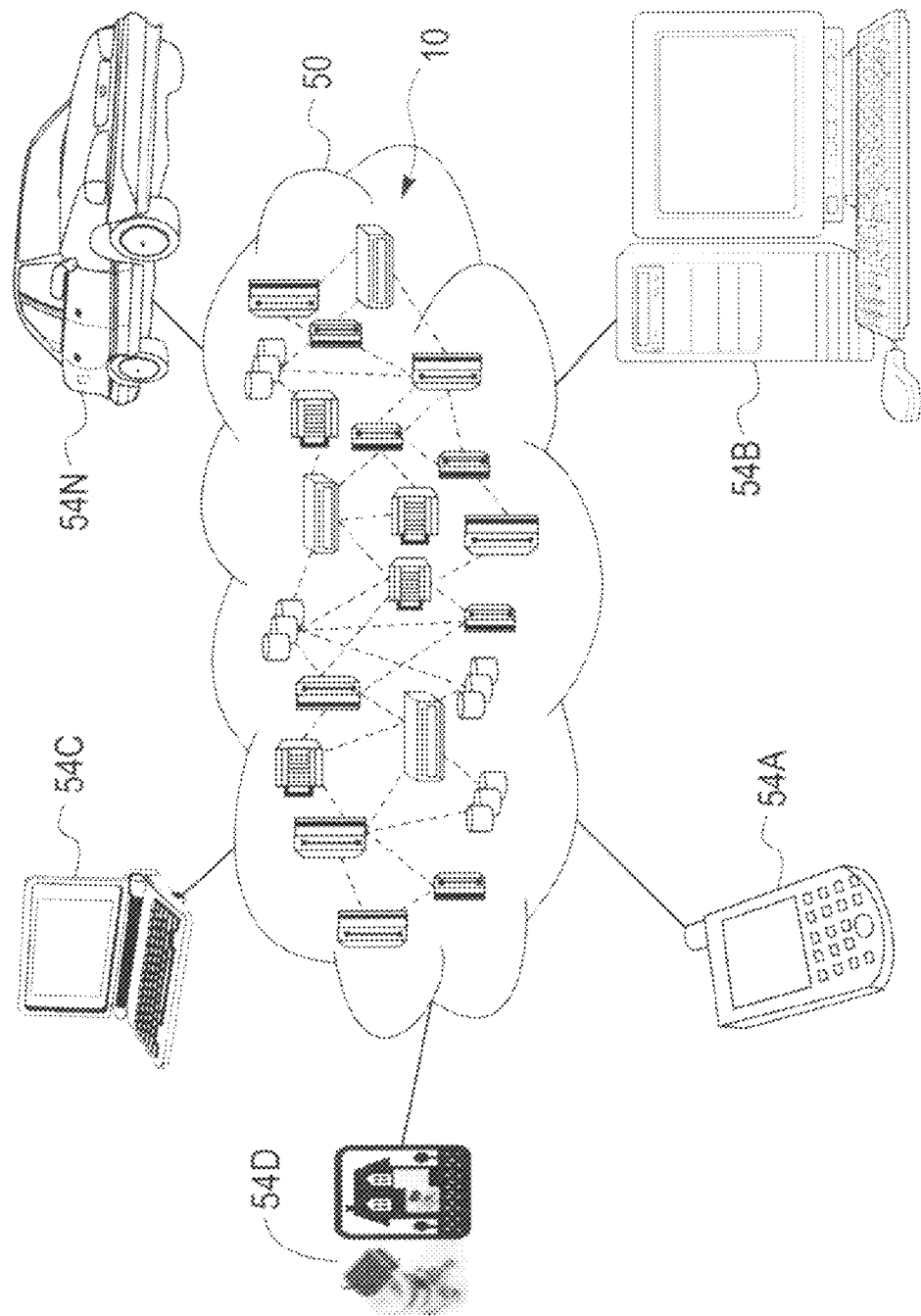
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, Smart Meters 54D, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
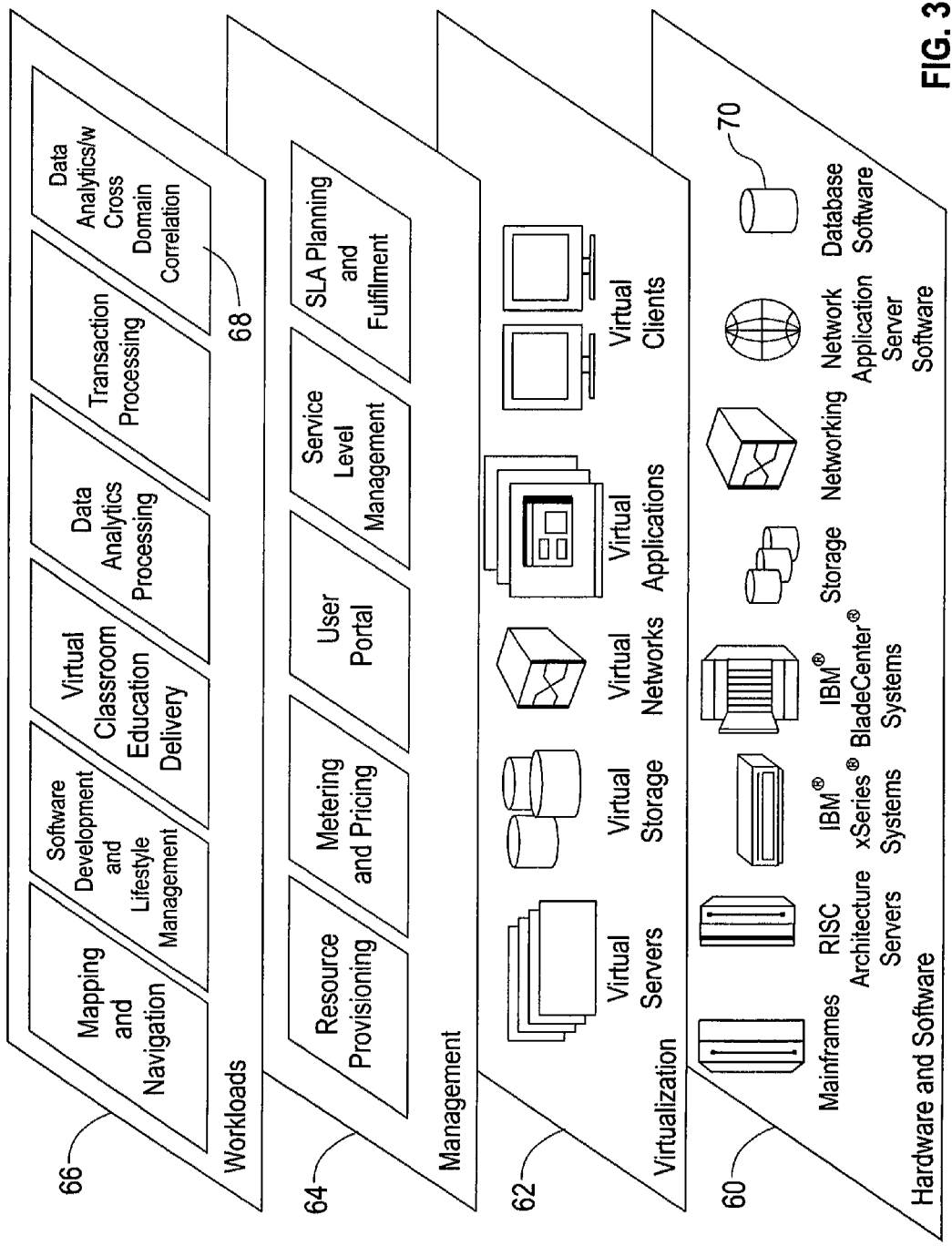
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software 70, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and in particular, data analytics with cross-domain correlation 68.

A cross-domain data dependency model between input data and derived data and associated application programming interfaces (APIs) for the analytics to leverage cross-domain knowledge are proposed herein to reduce the ambiguity caused by the use of single domain data. Embodiments of the present invention relate to the generation of more efficient and accurate analytics based on this cross-domain data dependency model, i.e., data analytics with cross-domain correlation 68 (hereinafter referred to as "the analytics 68"). The analytics 68 uses a set of cross-domain rules that establish relationships between parameters derived from multiple distinct data domains (e.g., sensor data from Smart Meters 54D, transit data, weather data, etc.). The analytics 68 can analyze data from the multiple data domains against the cross-domain rules to provide a more accurate and efficient analysis.

Figure 4:
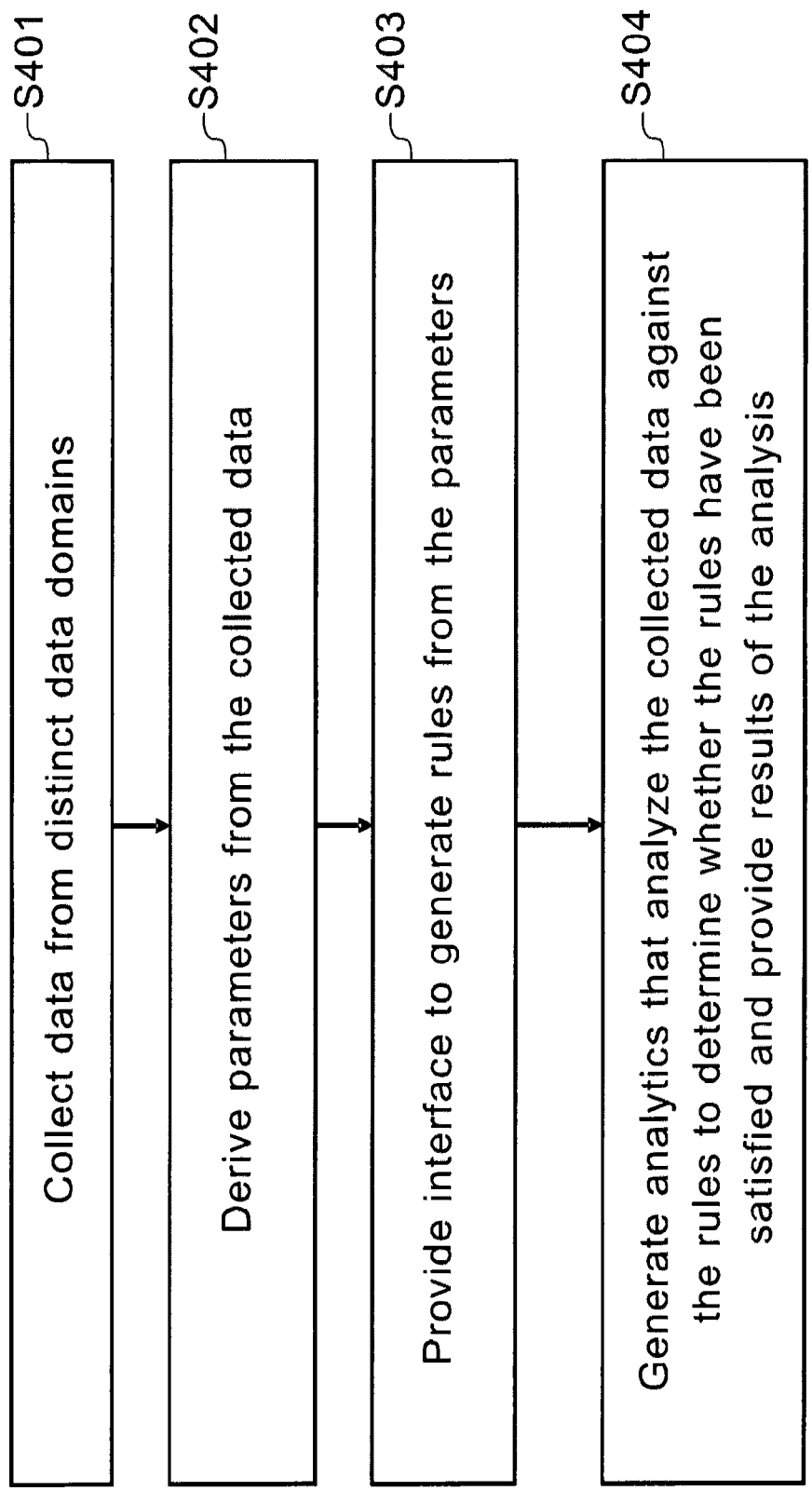
FIG. 4 illustrates a method of generating the analytics according to an exemplary embodiment of the invention.

FIG. 4 illustrates a method of generating the analytics 68 according to an exemplary embodiment of the present invention. Referring to FIG. 4, the method includes collecting data from the data domains (S401), deriving parameters from the collected data (S402), providing a user with a facility to generate rules from the parameters (e.g., cross-domain rules) (S403), and generating the analytics 68 that analyze the collected data against the rules to determine whether the rules have been satisfied and provide results of the analysis (S404). As an example, one of the data domains could be the water consumption domain and the other domain could be the electricity consumption domain. The parameters may include first-domain parameters derived from at least one of the domains and second parameters derived from at least another one of the domains. At least one of the rules is based on at least one of the first-domain parameters and at least one of the second-domain parameters, thus representing a cross-domain correlation rule. The method may be executed on the server 12 shown in FIG. 1.

Referring back to step 5401, each distinct data domain may include information generated from different information silos, which are incapable of communicating the information with one another. For example, the single-domain data provided by one information silo may be in a format that is incompatible with that of the other information silo or the information silos may not be connected to one another. As an example, the information silos may correspond to separate systems that collect sensor data respectively including water usage measurements from water meters, electricity consumption measurements from electricity meters, vehicle counts (e.g., a count of the number of vehicles crossing a particular location/street), weather measurements, etc.

The sensor data may be provided by the Smart Meter 54D shown in FIG. 2, which can be located at various sites, such as residences, schools, a businesses, hospitals, etc. The Smart Meters 54D may be similar to a meter that makes an observation (e.g., a temperature sensor, a pressure sensor, etc.) or a meter that measures consumption of a resource (e.g., a water meter, an electricity meter), but can additionally time-stamp each measurement and periodically send these time-stamped measurements within sensor data over a wired/wireless computer network for output to a central location (e.g., server 12) or some other repository (e.g., an FTP site).

The sensor data may include source information that identifies the source of the data. For example, each Smart Meter 54D may have a unique identifier and include that identifier within the sensor data that it sends to the central location. The central location may have a database (e.g., database 70) where each unique identifier is listed along with the address of where that Smart Meter 54D was installed. Further, if the Smart Meter 54D has a GPS, it may embed its current coordinates into the sensor data. The Smart Meters 54D may be configured locally (e.g., at the residence) or remotely (e.g., across a wired/wireless computer network) by a remote user (e.g., inside or outside of the cloud 50) to record a certain duration of sensor data (e.g., amount of resource consumed in the last hour, day, etc.) and to send this data at a certain frequency (e.g., hourly, daily, etc.).

The central location (e.g., server 12) can sift through the sensor data to generate parameters that can be used to construct rules for making predictions. A user accessing the central location may be provided with a user interface that lists the available parameters. For example, the parameters could indicate resources used (e.g., water, electricity, oil, gas consumed, etc.) or observations (e.g., temperature, pressure, vehicle count, etc.), the identity of the consumers (e.g., those within county A, those on Block B, etc.), time periods (e.g., within last hour), threshold values or ranges (e.g., >than 10 gallons, less than 100 kilowatts, temperature<32 degrees Celsius, pressure>30 inches of mercury, etc.), and logical operators (e.g., and, or, not, etc.). The user interface may also allow manual entry of the time periods, threshold values, ranges, etc. The user interface may allow the user to specify a prediction based on whether the rule is satisfied (e.g. a leak is present, a dishwasher is present, a road is blocked, etc).

The user interface may allow a user to build a rule by providing the available parameters as selectable choices, allowing the user to select/enter a condition for each parameter to make conditional statements, allowing the user to connect the conditional statements using logical operators to create the rule, and allowing the user to assign a prediction to the created rule. An example of a rule that may be generated from the user interface is as follows: "prediction=leak" if "water>10 gallon in last hour" and "electricity<100 Kw in last hour", where this rule predicts a leak at a residence whenever water consumption at the residence exceeds 10 gallons an hour and electricity consumption at the residence exceeds 100 Kw an hour.

Referring back to FIG. 4, the generated analytics 68 analyze the collected data and potentially any newly received data against the rules to determine whether the rules have been satisfied and provides users of the analytics 68 results of the analysis. For example, the prediction associated with the satisfied rule may be assessed by or presented to a user of the analytics 68. Knowledge that a particular rule is not satisfied may also be provided to the user.

When the rule depends on data from two distinct and different data domains (e.g., water and electricity) the rule is considered a cross-domain rule. The prediction associated with the cross-domain rule may have more accuracy than a prediction from a single-domain rule. For example, using single-domain analytics, one could conclude a leak has occurred based on single-domain data showing a residence has consumed 12 gallons of water in the last hour. However, in cross-domain analytics according to embodiments of the invention, one might instead conclude that no leak is present since the cross-domain correlation rule is compared against the multiple-domain data including both the water consumption and the electricity consumption. For example, if the power consumption exceeds 125 Kw and the water consumption is 12 gallons, the above rule would conclude there is no leak (e.g., the water could have been consumed by an appliance such as a washer machine or a dishwasher that causes or contributes to the 125 Kw power usage).

The analytics 68 may be configured to provide statistics based on patterns of usage to derive additional parameters for generating the rules. For example, an examination of water usage measurements of a residence and their time-stamps may uncover that water is consumed on average between 6 am-9 am and is rarely consumed between 12 pm-2 pm (e.g., the average period of non-use). Thus, one could refine the above rule to read "prediction=leak" if "water>10 gallon in last hour"|| ("water>5 gallon within last hour" and "within period of non-use") and "electricity<100 Kw in last hour" to improve the accuracy of predicting a leak.

The central location may receive data from sources other than Smart Meters 54D. For example, systems may be used to measure and record the number of vehicles that cross a particular point on a road during a given period of time. Systems that provide these traffic measurements could be adapted to send their data to the same central location. The analytics can then extract parameters from the traffic measurements to further refine the above described rules. For example, a rule could be created that specifies the route for repairing a leak, such as "route for repair of leak=A" if "traffic count<100 in last hour" and "water>10 gallon in last hour" and "electricity<100 Kw in last hour". In this way, the leak can be fixed in a more expedient manner.

The central location may receive weather data in addition to the other data. For example, systems may measure and record temperature, pressure, snow fall counts, dew point, humidity, etc. Systems that provide these weather measurements could be adapted to send their data to the same central location. The analytics can extract parameters from the weather data to further refine the above described rules. For example, a rule could be created that specifies another route for repairing a leak, such as "route for repair of leak=B" if "snow fall>5 inches in last hour" and "water>10 gallon in last hour" and "electricity<100 Kw in last hour".

Various additional sensor data may be sent to the central location so that additional parameters and rules may be created. For example, communications between emergency medical responders to an accident (e.g., nature of injury, location of accident) and hospital data (e.g., experts in spinal trauma) could be sent to the central location. Then a rule could be devised that determines the best hospital for taking the victim of an accident. For example, "hospital=A" if "injury=spinal" and "location=county A" and "traffic count<100 in last hour". The results/predictions of the rule may be sent from the analytics 68 to the responder to aid the responder in selecting the best hospital via various communication methods (e.g., a text message, instant message, etc).

The analytics 68 may be configured to receive feedback from a user of the analytics regarding the rules it reports on, and modify the rule based on the feedback or suppress results of the rule. For example, if a leak was determined by the above rule to be occurring at a residence, and a user of the analytics 68 (e.g., a user responsible for providing utilities, a consumer of the utilities, etc.) indicated to the analytics 68 that a leak was not present at the residence, the analytics 68 could but suppress the indication of the leak for that residence. As an example of the rule modification, if the residence was determined to have a leak, and negative feedback regarding the leak is received, the rule could adjust its threshold values for determining a leak based on the consumption of the residence. For example, if the residence was found to be using 11 gallons of water (i.e., an amount above water condition of 10 gallons), the rule could be modified to only flag water consumption above 11 gallons. Alternately, a modifier (e.g., +1 gallon) could be stored for the residence by the analytics 68 and applied when the "is leak" rule is evaluated for the residence. Further, the analytics 68 could provide survey questions to the residence to gather feedback about the residence (e.g., how many dish/clothing washers, residents, etc.) to improve the rule or the rule's application to the residence.

Figure 5:
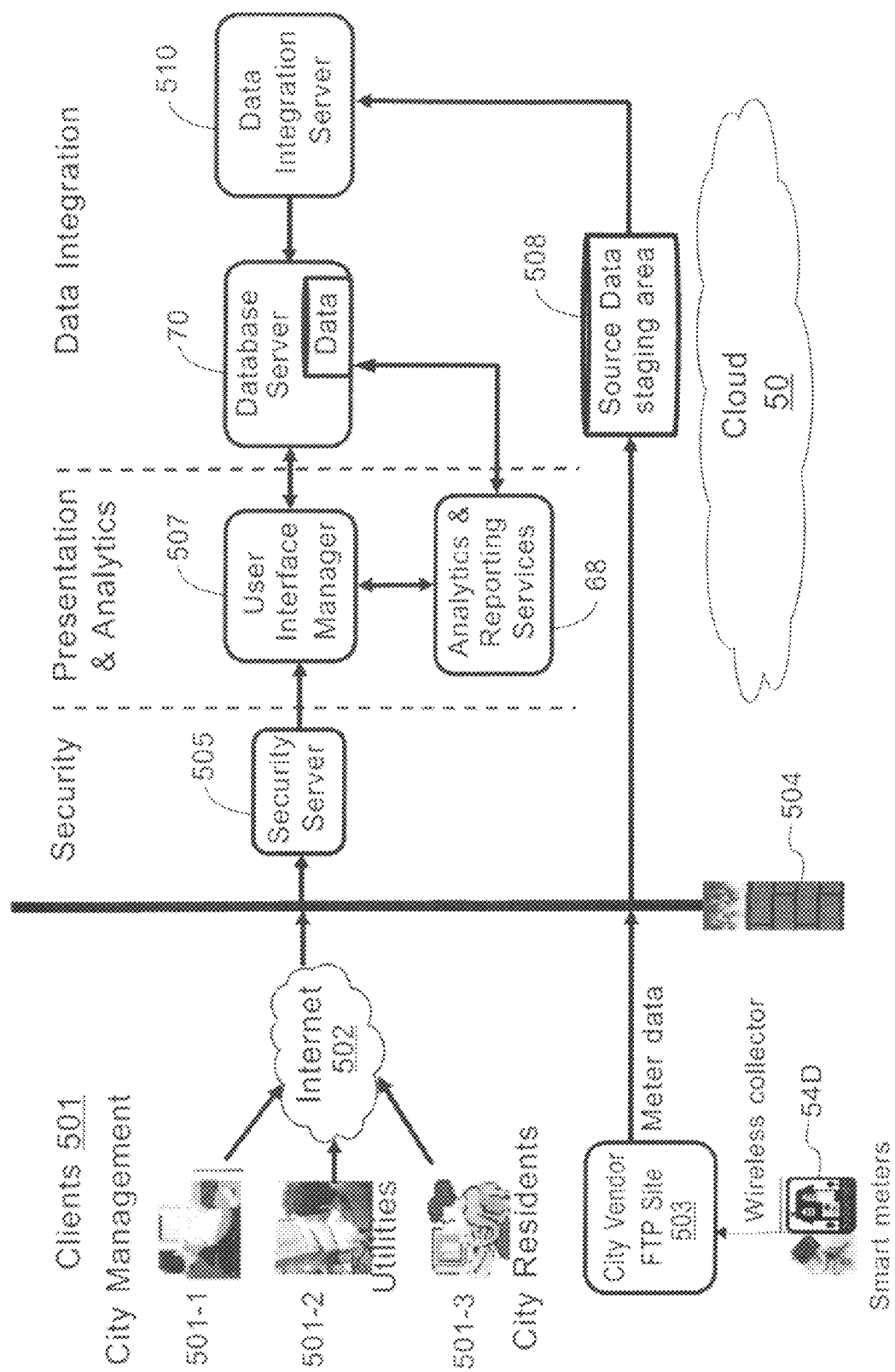
FIG. 5 illustrates a system that uses the analytics according to an exemplary embodiment of the present invention.

FIG. 5 illustrates an exemplary embodiment of a system that uses the above described analytics 68. The system is primarily used to manage the resources of a city. For example, the system includes clients 204, Smart Meters 54D, and the Cloud 50. The Cloud 50 includes a user interface manager 507, a database server 212, and the analytics 68. In this example, the clients 501 include clients for managing the city 501-1, clients that operate/provide utilities 501-2, and clients that receive the utilities 501-3 (residents, businesses, schools, hospitals, etc.). While the analytics 68 will be discussed below with respect to a system that is used to manage resources of a city, embodiments of the present invention are not limited thereto.

The Smart Meters 54D provide sensor data to the analytics 68 from at least two distinct data domains. One or more of the Smart Meters 54D may be located at a site of each client receiving the utilities 501-3 to measure the resources used by that client (e.g., water, electricity, etc.). The Smart Meters 54D record consumption of the resource in intervals (e.g., a number of minutes, an hour, etc.) and communicate that information periodically (e.g., hourly, daily, etc.) to the analytics 68.

The Smart Meters 54D send the sensor data to a FTP site 503 that is outside the cloud 50. The FTP 503 site may be managed by the city. The FTP site 503 may anonymize the sensor data before sending it to the cloud 50. For example, if the sensor data includes information (e.g., name) of a resident, the FTP site 503 could replace this information with a unique ID or strip out this information entirely. In alternate embodiments of the system, the FTP site 503 is omitted and the Smart Meters 54D send the sensor data directly to the cloud 50.

The cloud 50 is shown in FIG. 5 as being protected behind a firewall 504. However, in alternate embodiments of the invention, the firewall 502 may be omitted. The cloud 50 includes a security server 505 to authenticate the clients 501 that desire to connect to the analytics 68. As an example, the security server 305 may include WebSEAL®, which is a multi-threaded webserver from IBM research. WebSeal is a component of the Access Manager of Tivoli® from IBM research. The Tivoli Access Manager may evaluates a request for a service from a user of a client that passes through WebSeal® (e.g., a request from one of clients 501) to determine whether the user is authorized to access the requested service. However, in alternate embodiments of the invention, the security server 505 is omitted.

The clients 501 that connect to the analytics 68 are presented with a user interface from a User Interface Manager 507 based on the client type. The Application Server of WebSphere®, a product from IBM Research, may be used as the User Interface Manager 507.

Figure 6:
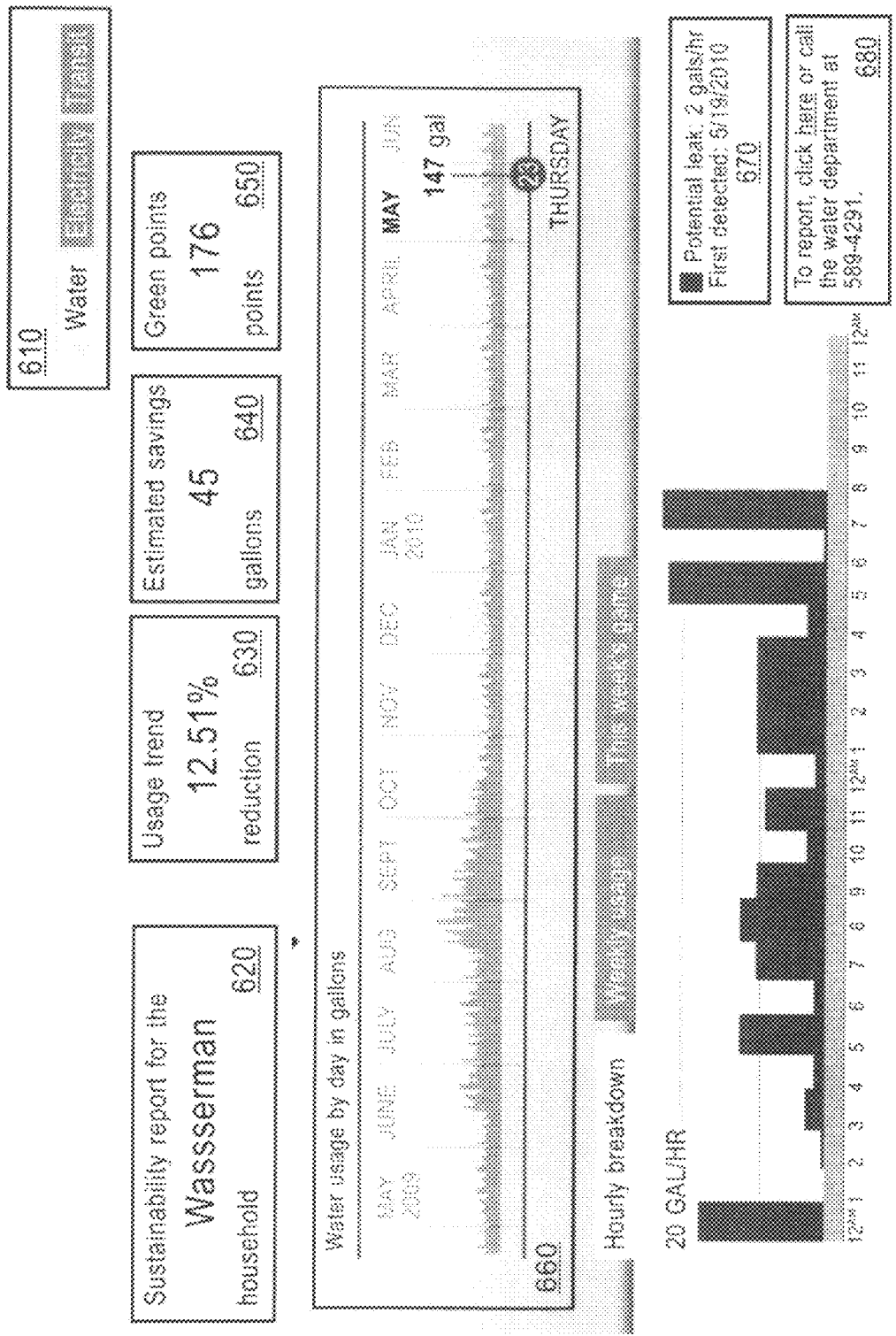
FIG. 6 illustrates an example of a view that may be provided to a user of the system of FIG. 5.

FIG. 6 shows an example of an interface that may be provided to the resident clients 501-3 by the Interface Manager 507. Referring to FIG. 6, the interface includes a data selection tab 610, a name 620, a usage trend 630, estimated savings 640, an incentive 650, consumption history 660, warnings 670, and a contact mechanism 680.

The data selection tab 610 allows the user to select between the available data (e.g., water usage, electricity usage, transit data, oil usage, gas usage, etc.).

The name 620 illustrates an identifying label associated with the client, such as their family name, address, etc.

The usage trend 630 illustrates the amount that a client has increased/decreased their usage of a resource as compared to a previous period.

The estimated savings 640 illustrates an estimated amount of the resource they have saved in comparison to the previous period. This amount could be negative if the usage trend indicates an increase in usage.

The incentives 650 illustrate the number of incentives accrued so far. For example, if a client has maintained a usage of a resource below some threshold value, they may receive points as an incentive to conserve.

The consumption history 660 shows the usage of a resource over a period of time (e.g., over the last year), which may be broken down over intervals (e.g., a month, daily, hourly).

The warnings 670 provide information to aid the client (e.g., indicate a leak is present).

The contact mechanism 680 provides a mechanism for the client to communicate (e.g., provide feedback) with the utilities 501-2, the city management 501-1, or the analytics 68. For example, a selectable link may be provided to allow the client to send a message (e.g., email, instant message, text message, etc.). The interface may additionally provide information on future consumption, which be derived from past consumption and other available data such as weather data/history. For example, if the forecast is for high temperatures, the future consumption of water could be derived by multiplying the current consumption of water by a factor based on the predicted temperature. However, the interface illustrated in FIG. 6 is merely an example as alternate embodiments may provide less information or include additional information.

Figure 7:
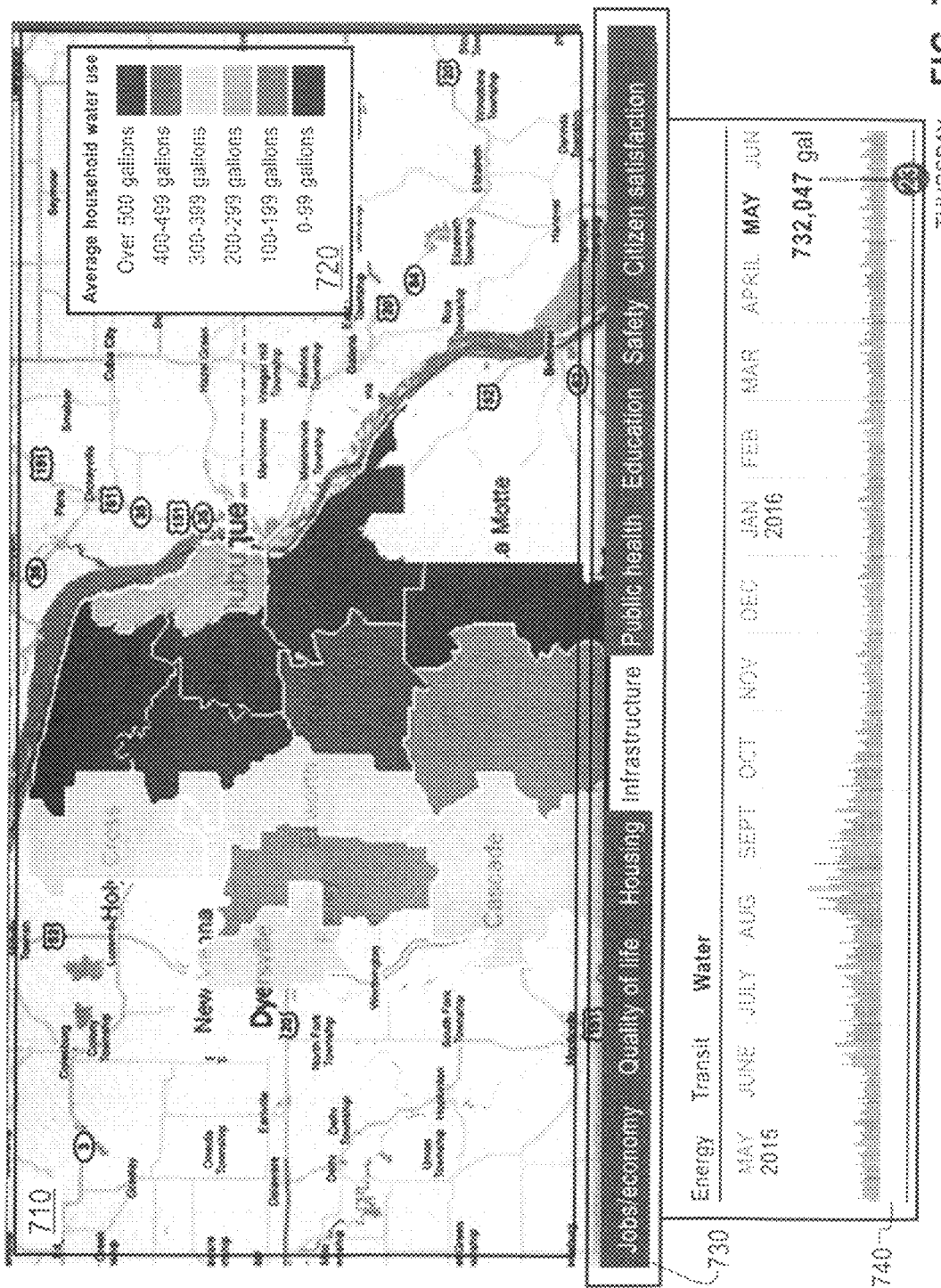
FIG. 7 illustrates an example of a view that may be provided to a user of the system of FIG. 5.

FIG. 7 illustrates an example of a view that could be presented to a city manager 501-1. Referring to FIG. 7, the view shows a map 710 of the city that is being managed where regions of interest are color coded. In this example, regions are colored based on a particular water usage range or threshold. For example, the data from all the residents of that region can be combined to determine the proper color. The view may include a legend 720 that explains the meaning of each color. Regions having differing resource usage may be denoted in a manner other than varying colors such as varying shading, etc. The view may include a data tab 730 that allows the manager 501-1 to view all of the available data domains. The view may include a forecasted consumption data 740 for the city. In this example, the consumption data 740 shows the total amount of water that the city is predicted to consume in future years using the cross-domain data (e.g., past resource consumption, infrastructure information, weather data, etc.). For example, the infrastructure information could include the number of dishwashers, sprinkler systems, etc. within the city. The consumption data 740 can show forecasts of resources that are expected to be consumed by the city over shorter individuals (e.g., over the next day, week, month, etc.). In alternate embodiments of the view, consumption data other than water usage may be illustrated (e.g., electricity, oil, gas, etc). The view allows for real-time management of the city.

Referring back to FIG. 5, the analytics 68 operates on the sensor data sent from the Smart Meters 54D to generate the statistics and predictions that may be viewed on interfaces presented to the residents, residents, and managers 501. In FIG. 5, the sensor data is initially sent to a staging area 508 (e.g., for temporary buffering of the data), forwarded for integration on a data integration server 510, and then stored in a database server 70. For example, the data integration server 507 may be the Information Server of InfoSphere®, which is a product developed at IBM Research. For example, the database server 70 may be DB2®.

The analytics 68 may further provide an application programming interface (API) to enable users to share and exchange information. The API may include function calls that enable a user of the analytics 68 to access and display results of the rules. The results may include predictions (e.g., whether a location has a dishwasher, a washing machine, automatic sprinklers, etc.) and predicted events (e.g., whether a location has a water leak). The API may include function calls that allow a user of the analytics 68 to define the correlation rules or create an alert to warn when one of the rules has been satisfied or violated. The API may further include function calls that allow a user of the analytics 68 to define how results of the rules are to be displayed in a user interface.

It is to be understood that exemplary embodiments disclosed above are illustrative only, as the invention may be modified and practiced in different but equivalent manners apparent to those skilled in the art having the benefit of the teachings herein. It is therefore evident that exemplary embodiments disclosed herein may be altered or modified and all such variations are considered within the scope and spirit of the invention.

What is claimed is:

1. A method of generating analytics to provide an analysis of data from distinct data domains, the method comprising:
   collecting data from at least two distinct data domains;
   deriving parameters from the collected data comprising first domain parameters derived from a first one of the data domains and second domain parameters derived from a second other one of the data domains;
   providing a data model that enables a user to select one of the first domain parameters, one of the second domain parameters, and create a rule based on the selected parameters; and
   generating analytics that analyzes the collected data against the rule to determine whether the rule has been satisfied,
   wherein the method is performed by a data processing machine,
   wherein the analytics predicts whether a single event has occurred or not occurred by using the rule to compare data of the first data domain against the selected first domain parameter and compare data of the second data domain against the selected second domain parameter,
   wherein the data of the first data domain is electricity consumption data, the data of the second data domain is water consumption data, the first selected domain parameter is a threshold amount of electricity consumed, and the second selected domain parameter is a threshold amount of water consumed.

2. The method of claim 1, wherein each data domain includes information generated from different information silos, which are incapable of communicating their corresponding information with one another.

3. The method of claim 1, wherein the data is received from Smart Sensors remote from the data processing system.

4. The method of claim 1, wherein at least one of the parameters is a consumption amount of a resource used by a consumer during a consumption period.

5. The method of claim 4, wherein the analytics are configured to determine an average period of non-use of the resource.

6. The method of claim 1, wherein the data includes locations from where the data is sourced and the parameters include the locations.

7. The method of claim 6, wherein the data includes weather data at the locations, and the parameters include weather parameters based on the weather data.

8. The method of claim 1, wherein the analytics provides the prediction to a user.

9. The method of claim 8, wherein the analytics is configured to receive feedback from the user and suppress output of the prediction to the user based on the feedback.

10. The method of claim 1, wherein the single event is use of an electrical appliance.

11. The method of claim 1, wherein the single event is a water leak.

12. The method of claim 1, wherein when the single event has occurred, a water leak has occurred, and when the single event has not occurred, an electrical appliance has consumed water of the water consumption data.

13. A system to provide an analysis of sensor data from distinct data domains to clients, the system comprising:
- a computer network;
- first sensors configured to measure data from a first data domain and transmit the measured data across the network;
- second sensors configured to measure data from a second data domain and transmit the measured data across the network, wherein the data domains are different from one another;
- a plurality of client workstations configured to communicate across the network;
- a server workstation that is remote from client workstations and configured to communicate with the client workstations and receive sensor data comprising the measured data from the sensors across the network, wherein the server workstation comprises:
  - a user interface server that enables a user to select one of first domain parameters derived from the first data domain, select one of second domain parameters derived from the second data domain, and generate a correlation rule based on the selected parameters; and
  - a database server to store the sensor data, the parameters, and the correlation rule; and
  - analytics that analyze the stored sensor data against the correlation rule to determine whether the rule has been satisfied,
- wherein the analytics predicts whether a single event has occurred or not occurred by using the rule to compare data of the first data domain against the selected first domain parameter and compare data of the second data domain against the selected second domain parameter,
- wherein the data of the first data domain is water consumption data, the data of the second data domain is electricity consumption data, the first sensors are water meters and the second sensors are electricity meters, the first selected domain parameter is a threshold amount of water consumed, and the second selected domain parameter is a threshold amount of electricity consumed.

14. The system of claim 13, wherein each data domain includes information generated from different information silos, which are incapable of communicating the information with one another.

15. The system of claim 13, wherein the server workstation is a cloud computing infrastructure.

16. The system of claim 13, further comprising an FTP server, wherein the FTP server receives the sensor data from the client workstations, anonymizes the sensor data, and sends the anonymized sensor data to the server workstation, wherein the sensor data includes an identifier that identifies the consumer and the anonymized sensor data excludes the identifier.

17. The system of claim 16, further comprising:
- a security server to authenticate clients of the client workstations that desire to connect to the analytics;
- a source data staging area to temporarily buffer the anonymized sensor data; and
- a data integration server integrating the buffered anonymized sensor data into tables in the database server.

18. A computer program product for generating analytics to provide an analysis of data from distinct data domains, the computer program product comprising:
- a non-transitory computer readable storage medium having computer readable program code embodied therewith, the computer readable program, code comprising:
  - computer readable program code configured to collect data from at least two distinct data domains, derive parameters from the collected data comprising first domain parameters derived from a first one of the data domains and second domain parameters derived from a second other one of the data domains, provide a data model that enables a user to select one of the first domain parameters and one of the second domain parameters, and generate a rule based on the selected parameters, and generate analytics that analyze the collected data against the rule to determine whether the rule has been satisfied,
- wherein the analytics predicts whether a single event has occurred or not occurred by using the rule to compare data of the first data domain against the selected first domain parameter and compare data of the second data domain against the selected second domain parameter,
- wherein the data of the first data domain is electricity consumption data, the data of the second data domain is water consumption data, the first selected domain parameter is a threshold amount of electricity consumed, and the second selected domain parameter is a threshold amount of water consumed.

* * * * *